United States Patent
Huss et al.

(10) Patent No.: US 6,739,175 B2
(45) Date of Patent: May 25, 2004

(54) APPARATUS FOR PERFORMING MECHANICAL TESTS ON STRUCTURES

(75) Inventors: Pierre Huss, Strasbourg (FR); Francois Calvignac, Haguenau (FR); Claude Schmitt, Lemberg (FR); Jean-Marie Pognon, Reichshoffen (FR); Jean-Charles Muller, Reipertswiller (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/290,321

(22) Filed: Nov. 8, 2002

(65) Prior Publication Data
US 2003/0089268 A1 May 15, 2003

(30) Foreign Application Priority Data
Nov. 13, 2001 (FR) ............................................. 01 14650

(51) Int. Cl.⁷ ............................ G01P 13/00; G01M 7/00
(52) U.S. Cl. ...................................... 73/11.06; 73/12.04
(58) Field of Search ............................... 73/11.04, 11.06, 73/11.07, 12.01, 12.04, 12.07, 12.09

(56) References Cited

U.S. PATENT DOCUMENTS

| | | | |
|---|---|---|---|
| 3,939,691 A | * | 2/1976 | Stanev et al. ............... 73/12.01 |
| 5,325,700 A | | 7/1994 | Litten |
| 5,485,742 A | * | 1/1996 | Litten ........................ 73/11.06 |
| 5,623,094 A | * | 4/1997 | Song et al. ................. 73/12.07 |
| 5,635,624 A | * | 6/1997 | Cerny ........................ 73/12.01 |
| 5,652,375 A | * | 7/1997 | Da Re' Mario ............ 73/12.04 |
| 6,422,058 B1 | * | 7/2002 | Myles et al. ............... 73/12.04 |

FOREIGN PATENT DOCUMENTS

| | | |
|---|---|---|
| EP | 08240509 | 9/1996 |
| FR | 2 765 685 A1 | 1/1999 |

OTHER PUBLICATIONS

Database WPI, Section E1, Week 199212, Derwent Publications Ltd., London, GB: AN 1992–095445, XP002211257 & SU 1 658 006 A (FERR Metal Transpor), Jun. 23, 1991.

* cited by examiner

Primary Examiner—Edward Lefkowitz
Assistant Examiner—Takisha S. Miller
(74) Attorney, Agent, or Firm—Sughrue Mion, PLLC

(57) ABSTRACT

Apparatus for performing mechanical tests on structures, in particular on energy absorber elements in the field of railways, wherein a pyrotechnics launcher comprising a launch tube slidably receiving a thrust rod is disposed at one end of a segment of rail track, said pyrotechnics launcher being supported in its central portion by a support element and being prevented from moving backwards by a buffer stop element disposed behind the pyrotechnics launcher, said support element and said buffer stop element including fixing means making it possible to hold said pyrotechnics launcher at various heights relative to the rails of the rail track.

8 Claims, 5 Drawing Sheets

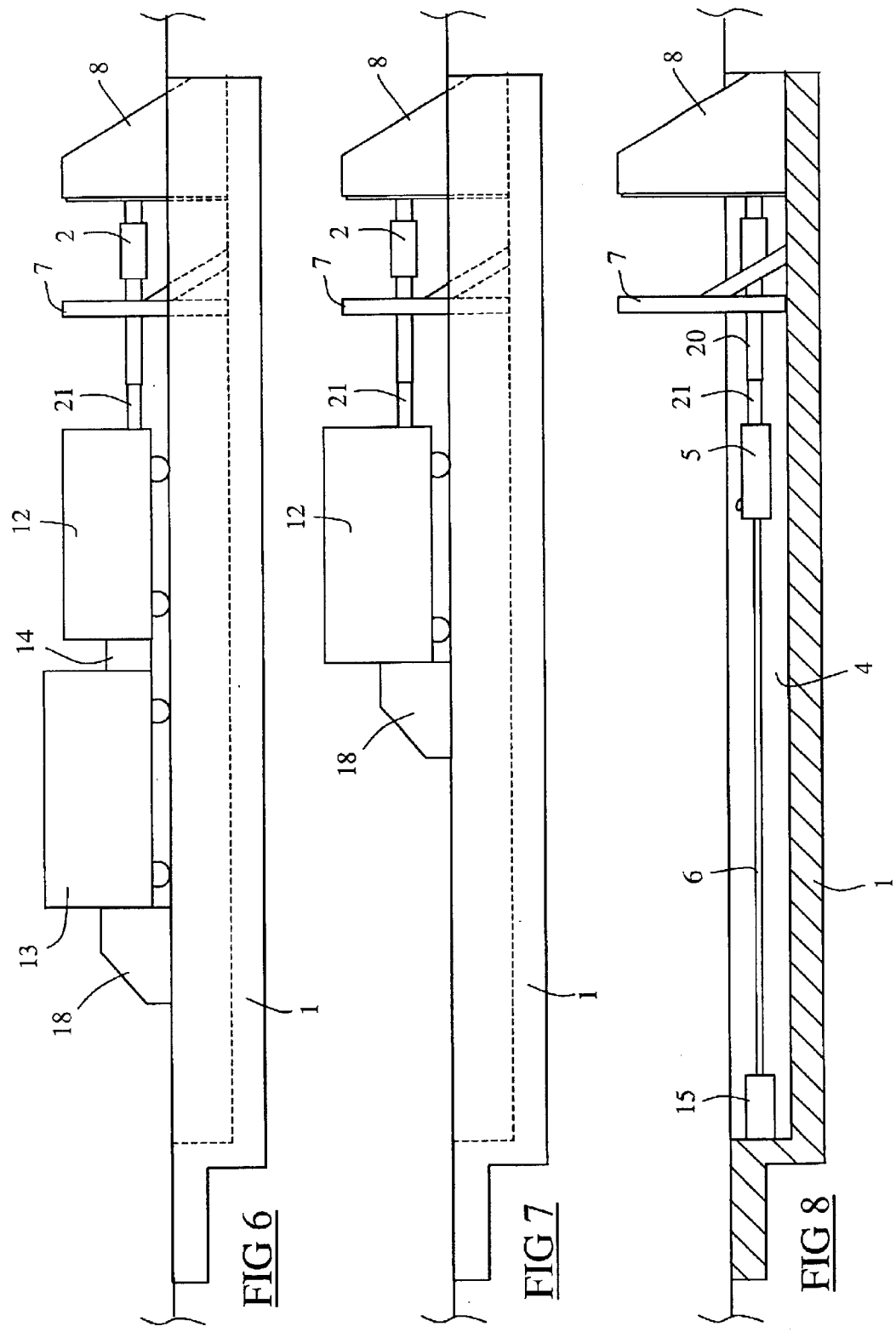

APPARATUS FOR PERFORMING MECHANICAL TESTS ON STRUCTURES

The invention relates to apparatus for performing mechanical tests on structures, and in particular on energy absorber elements in the field of railways. Such tests have the particularity of requiring energy levels that can be relatively high, and of the order of 6 megajoules (MJ).

BACKGROUND OF THE INVENTION

In the field of railways, impact testing apparatus is known in which a vehicle is put in motion on a rail track by means of a locomotive or else by gravity, using a track segment on a gradient. Once in motion, the vehicle hits an obstacle disposed on the rail track. Unfortunately, such testing apparatus suffers from the drawback of requiring a run up distance that is long, and generally longer than 500 meters (m), when the vehicle is "launched" by a locomotive, or else a difference in level that is considerable when gravity is used to put it in motion, which makes the facilities dedicated to such testing very costly.

Document FR 2 765 685 discloses acceleration and deceleration apparatus using a pyrotechnics launcher. Such a pyrotechnics launcher offers the advantage of being capable of propelling moving equipment on a test track with programmed acceleration and with high energy. However, the testing apparatus disclosed in that document is unsuitable for launching a variety of different types of vehicle (in particular different types of rail vehicle), and does not make it possible to perform a wide variety of mechanical tests involving a variety of quantities of energy.

In the field of railways, it is necessary to test different types of energy absorber having widely different absorption capacities. The most recent rail vehicles are equipped with energy absorber elements disposed in alignment with the underframe of the vehicle and dimensioned to absorb large quantities of energy, e.g. to damp an impact with another rail vehicle, but they can also be provided with energy absorber elements dimensioned to deform as from lower energy levels, and often associated with the structure of the driver's cab, making it possible to absorb an impact involving less energy, such as an impact with a road truck.

OBJECTS AND SUMMARY OF THE INVENTION

Thus, an object of the present invention is to provide apparatus for performing mechanical tests on structures, and in particular on energy absorbers in the field of railways, which apparatus includes a pyrotechnics launcher that makes it possible to launch moving elements of widely differing sizes under high energy while also minimizing the risk of the moving elements pitching. Another object of the invention is to provide apparatus for performing impact tests that is very adaptable by making it possible to test absorber elements of widely differing ratings and strengths.

To this end, the invention provides apparatus for performing mechanical tests on structures, in particular on energy absorber elements in the field of railways, wherein a pyrotechnics launcher comprising a launch tube slidably receiving a thrust rod is disposed at one end of a segment of rail track, said pyrotechnics launcher being supported in its central portion by a support element and being prevented from moving backwards by a buffer stop element disposed behind the pyrotechnics launcher, said support element and said buffer stop element including fixing means making it possible to hold said pyrotechnics launcher at various heights relative to the rails of the rail track.

In particular embodiments, the apparatus of the invention for performing mechanical tests may have one or more of the following characteristics taken in isolation or in any technically feasible combination:

- the buffer stop element and the support element stand on a concrete slab, said concrete slab also supporting a portion of the segment of rail track;
- the concrete slab is anchored in the ground by means of anchoring piles driven into the ground and embedded in part in said concrete slab;
- the concrete slab is provided with a pit extending between the rails of the rail track, said pit receiving a launch trolley which is mounted to slide between the rails and which can be propelled by the thrust rod;
- the fixing means for fixing the pyrotechnics launcher to the support element and to the buffer stop element make it possible to lower the pyrotechnics launcher below the level of the rails of the rail track, and the pit has a wall facing towards the pyrotechnics launcher and that can receive an energy absorber element which is to be tested and against which said launch trolley crashes;
- the support element is a gantry frame comprising two vertical elements provided with multiple holes making it possible to fix brackets at various heights for supporting a ring surrounding the launch tube, it being possible for the ring to pivot on the brackets about a horizontal axis perpendicular to the axis of the launch tube;
- the buffer stop element is constituted by a block of concrete having a substantially vertical wall against which a fixing plate is fixed that is disposed accurately perpendicular to the plane of the rails of the rail track, said fixing plate being provided with multiple holes making it possible to fix, at various heights, an abutment bracket to the end of which the rear end of the pyrotechnics launcher is fixed; and
- the thrust rod is supported directly by a vehicle by means of interface apparatus provided with means for adjusting the alignment of the thrust rod on the axis of the launch tube.

BRIEF DESCRIPTION OF THE DRAWINGS

The objects, features, and advantages of the present invention will be better understood on reading the following description of a particular embodiment of the invention, given by way of non limiting example, and with reference to the accompanying drawings, in which:

FIGS. 4 to 8 are diagrammatic views showing the use of the apparatus of the invention for performing various mechanical tests.

MORE DETAILED DESCRIPTION

Figure 1:
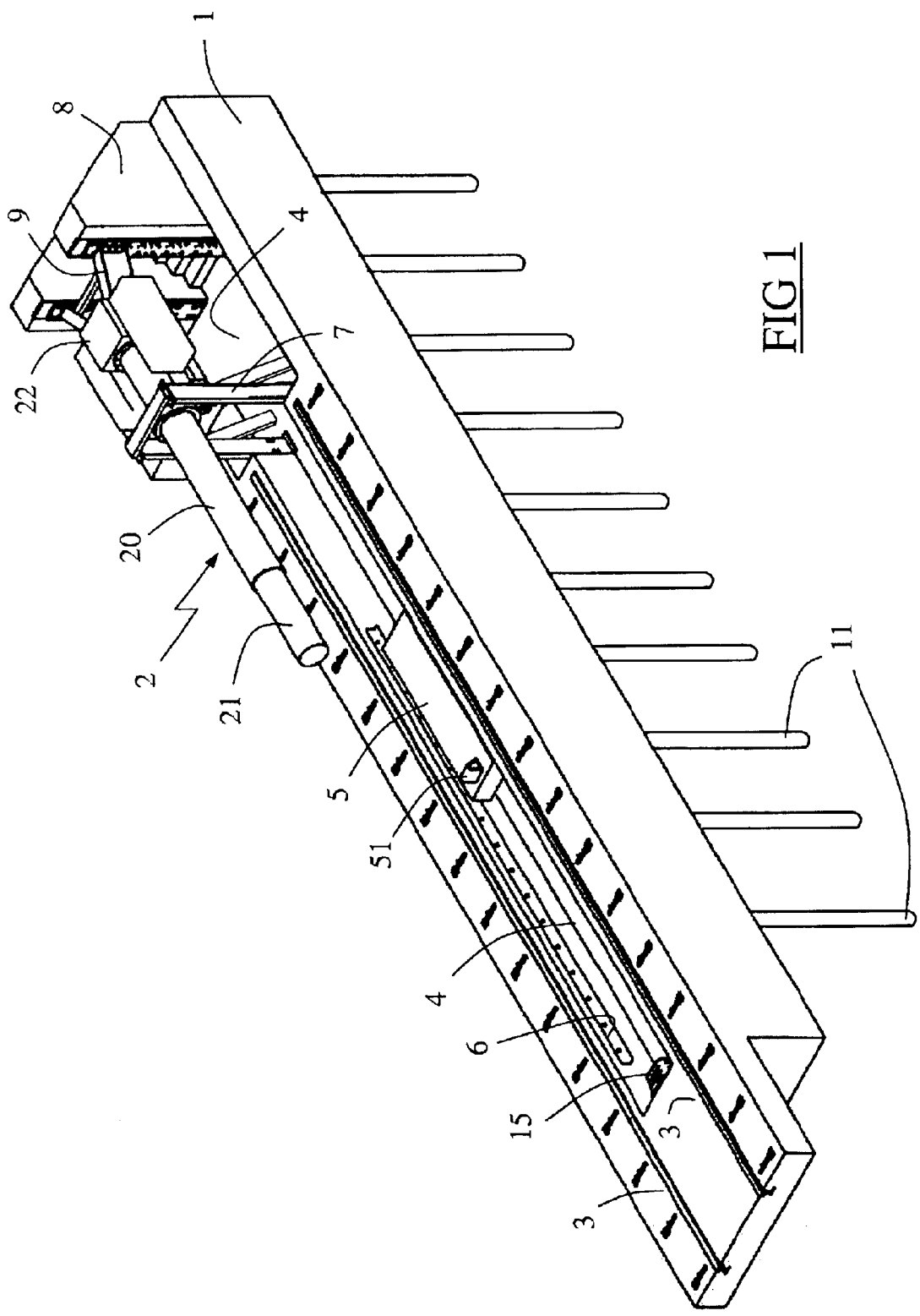
FIG. 1 is a perspective view of apparatus for performing mechanical tests on energy absorber elements in a particular embodiment of the invention.

To make the drawing clearer, only those elements which are necessary to understand the invention are shown. Like elements are given like references from one figure to another.

FIG. 1 shows a particular embodiment of the apparatus of the invention for performing mechanical tests. In this embodiment, the testing apparatus includes a concrete slab 1 extending over a length of several tens of meters (m), the width of the concrete slab 1 being about 2 m, and its thickness being about 1.5 m. The concrete slab 1 is sunk into the soil so that its top surface is flush with the surrounding ground. Advantageously, the concrete slab 1 is anchored by means of a series of piles 11 inserted into the soil and embedded in part in the concrete slab 1 in order to guarantee that the concrete slab 1 is held properly in loose soil.

As shown in FIG. 1, at one end, the concrete slab 1 supports a pyrotechnics launcher 2 which is known per se and which is capable of delivering various amounts of energy that can be as great as 6 megajoules (MJ). This pyrotechnics launcher 2 includes a launch tube 20 in which a thrust piston (not shown in the figures) is mounted to slide, which piston bears against a thrust rod 21, and is retained in the launch tube 20 by abutments at the end of its stroke, the thrust rod 21 being free to exit from the launch tube 20. The thrust piston is propelled inside the launch tube 20 by gas delivered by pyrotechnics gas generators 22 disposed in the rear portion of the launcher 2, which generators 22 can generate gases at programmed pressure making it possible to propel the thrust piston with programmed acceleration.

In front of the pyrotechnics launcher 2, the concrete slab 1 supports a segment of rail track 3 extending over the entire length of the concrete slab 1 and also extending beyond the concrete slab 1 over several tens of meters, the rails of the rail track 3 being sunk into the concrete so that the top surfaces of the rails are flush with the top surface of the concrete slab 1.

The concrete slab 1 is provided with a pit 4 extending under the pyrotechnics launcher 2 and extending in front of said launcher over several tens of meters between the rails of the rail track 3, the pit 4 being provided with a launch trolley 5 mounted to slide longitudinally on guides 6 disposed inside the pit 4. At the ends of the guides, at a distance of about 40 m from the pyrotechnics launcher 2, the pit 4 has a wall facing towards the pyrotechnics launcher 2, which wall can receive an energy absorber 15 against which the launch trolley 5 crashes. Advantageously, the pit 4 is also provided with inserts on its side walls, which inserts make it possible to fix an intermediate wall making it possible to support an energy absorber element, e.g. at a distance of 15 m or 25 m from the pyrotechnics launcher 2, and against which the launch trolley 5 crashes. On its top face, the launch trolley 5 is provided with a securing ring 51 enabling it to be secured to a lightweight vehicle standing on the rails of the rail track.

In the invention, the pyrotechnics launcher 2 is supported at its center by a gantry frame 7 fixed to the concrete slab 1, and it is prevented from moving at its rear portion by a buffer stop element 8 anchored in the concrete slab 1.

Figure 2:
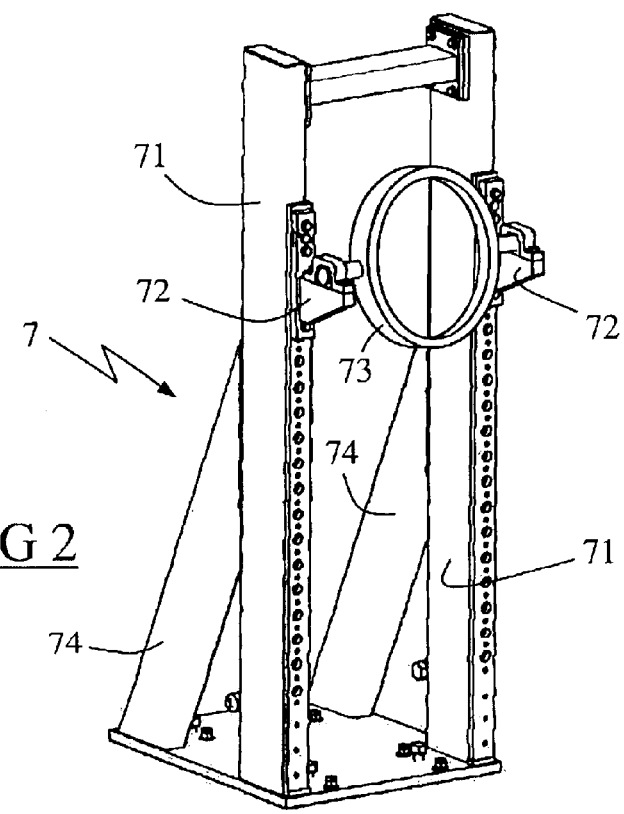
FIG. 2 is a detailed perspective view of the gantry frame whose central portion supports the pyrotechnics launcher of the apparatus of FIG. 1.

The gantry frame 7 is shown in more detail in FIG. 2, and it comprises two vertical elements 71 provided with multiple holes making it possible to fix brackets 72 at various heights, which brackets support a ring 73 surrounding the launch tube 20 (not shown in FIG. 2). The ring 73 is mounted on the brackets 72 along a horizontal axis perpendicular to the launch tube 20. The rear portions of the vertical elements 71 are reinforced by reinforcing bars 74.

Figure 3:
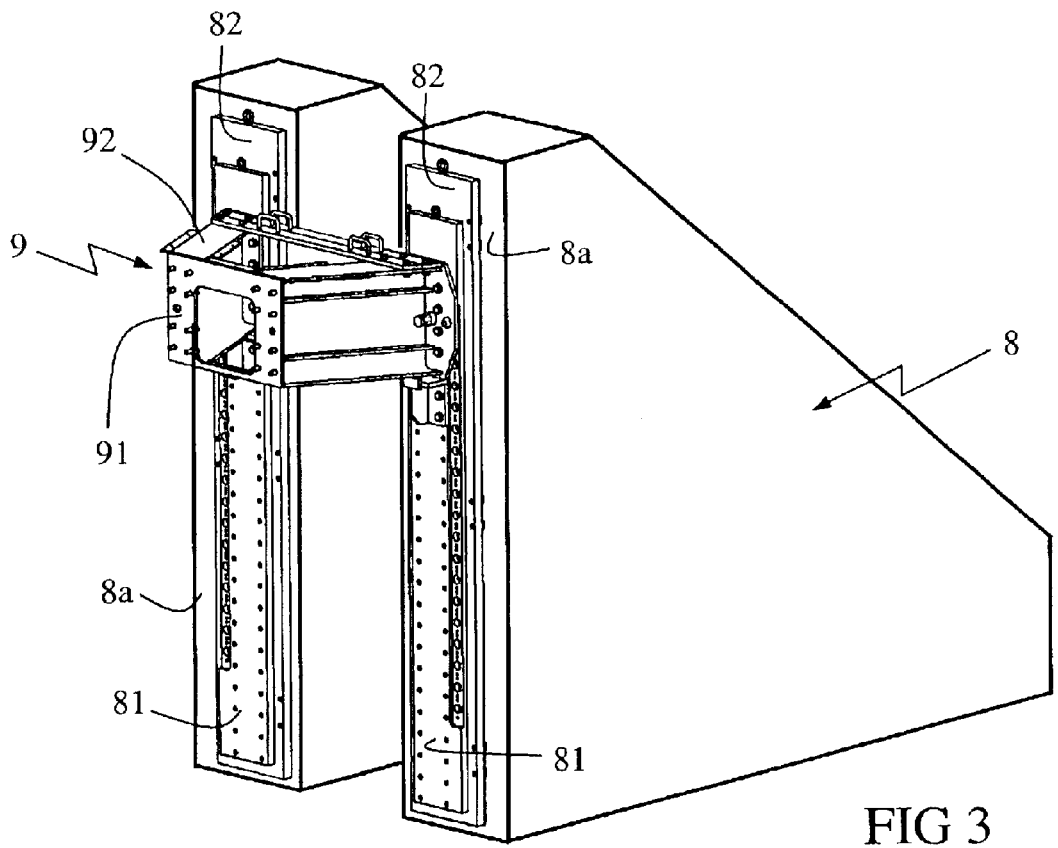
FIG. 3 is a detailed perspective view of the buffer stop element for preventing the pyrotechnics launcher of FIG. 1 from moving axially.

The buffer stop element 8, shown in detail in FIG. 3, is formed of a block of concrete split in two to accommodate access stairs giving access to the pyrotechnics launcher 2, and it has a wall 8a extending vertically behind the pyrotechnics launcher 2 and against which an abutment bracket 9 is fixed. The abutment frame 9 has an abutment surface 91 serving to be fixed directly to the rear portion of the pyrotechnics launcher 2, and has two slanting legs 92 that fix to two fixing plates 81 supported by the vertical wall 8a of the buffer stop element 8, these fixing plates 81 being provided with multiple holes making it possible to fix the abutment bracket 9 at different heights. As shown in FIG. 3, a metal intermediate plate 82 is interposed between the fixing plate 81 and the vertical wall 8a of the buffer stop element 8, this intermediate plate 82 being of thickness machined with very high precision to guarantee that the fixing plates 81 are accurately perpendicular relative to the rails of the rail track 3, by. compensating for any perpendicularity errors of the wall 8a. Such accuracy in positioning the fixing plates 81 makes it possible to guarantee excellent parallelism between the launch tube 20 and the rails of the rail track 3, via the abutment bracket 9.

Advantageously, the range of fixing heights at which the abutment bracket 9 can be fixed to the buffer stop element 8, and at which the brackets 72 can be fixed to the gantry frame 7 make it possible for launches to take place with the axis of the launch tube 20 being disposed in the range −300 millimeters(mm) to +1500 mm, with a discrete pitch of 100 mm, thereby making it possible to obtain various launch configurations, some of which are shown in FIGS. 4 to 8.

Figure 4:
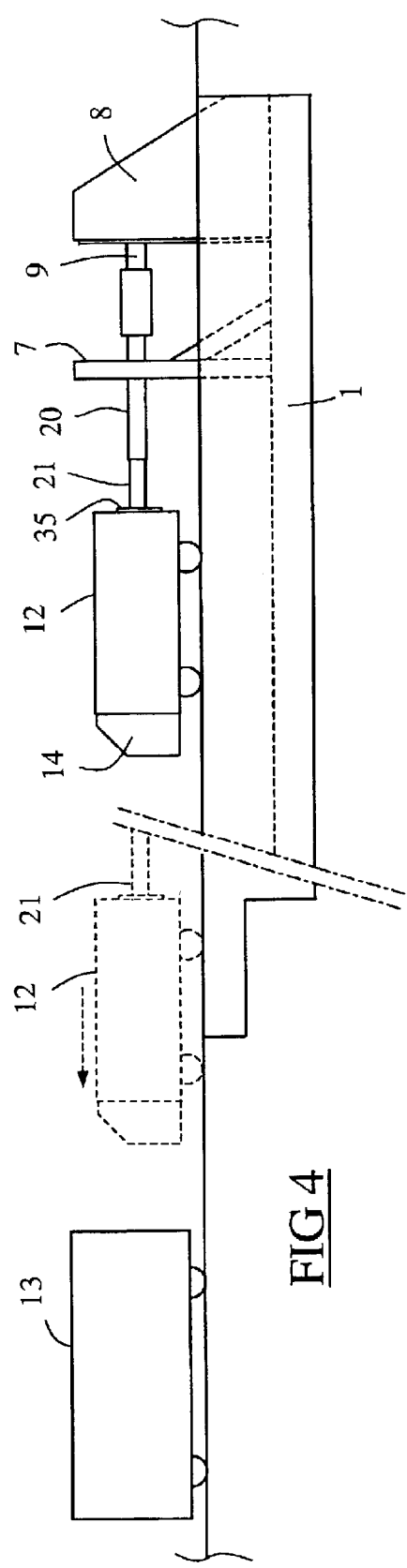

FIG. 4 shows an example of a launch configuration for performing impact tests by using the apparatus of FIG. 1. In this example, the pyrotechnics launcher 2 is used as a catapult, providing energy of about 1 MJ, for propelling a test vehicle 12 weighing about 3 metric tons (t) at a given speed into a stationary vehicle 13 weighing about 80 t and disposed downstream on the rail track 3. In this configuration, the front face of the test vehicle 12 is provided with an energy absorber element 14 to be tested, and the pyrotechnics launcher 2 is disposed at a height such that the axis of the thrust rod 21 substantially passes through the center of gravity of the test vehicle 12, thereby limiting any risk of pitching and thus of derailing on catapulting the test vehicle 12.

Figure 9:
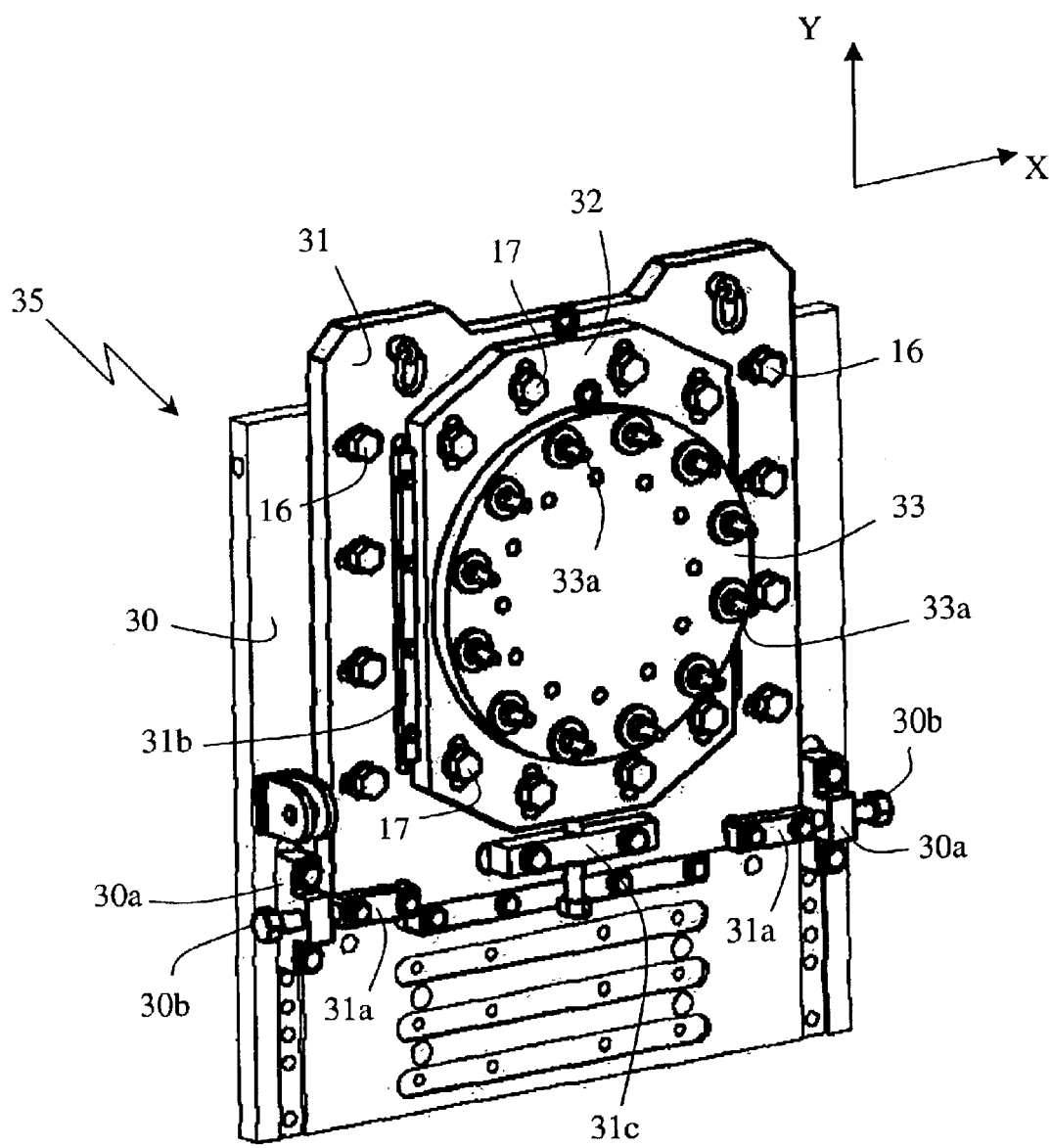
FIG. 9 is a perspective view of the interface apparatus providing the coupling between the vehicle and the thrust rod of the test apparatus of the invention.

Preferably, the rear face of the test vehicle 12 is provided with interface apparatus 35, such as the apparatus shown in FIG. 9, and against which the end of the thrust rod 21 of the launcher 2 is fixed, this interface apparatus 35 having means making it possible to adjust the alignment of the thrust rod 21 on the axis of the launch tube 20. As shown in FIG. 9, the interface apparatus 35 includes a base 30 secured to the vehicle 12, e.g. by being fixed to the rear vertical face of the test vehicle 12. This base 30 supports a first adjustment plate 31 which is prevented from moving relative to the base 30 by means of fixing screws 16 which pass through the first plate 31 via oblong holes enabling the first plate 31 to be displaced relative to the base 30 along the axis X when the fixing screws 16 are not tightened. The base 30 is of thickness greater than the width of the first plate 31, and, on either side of the first plate 31, it supports a stop 30a provided with a threaded bore extending along the axis X and provided with an adjustment screw 30b, one end of which comes into abutment against an abutment 31a carried by the first plate 31, the two stops 30a enabling the first plate 31 to be positioned accurately along the axis X relative to the base 30 before it is prevented from moving by tightening the fixing screws 16.

As shown in FIG. 9, the first adjustment plate 31 supports a second adjustment plate 32 of size that is small relative to the size of the first plate 31, the second plate 32 being prevented from moving relative to the first plate 31 by means of fixing screws 17 passing through oblong holes in the second plate 32, and screwing into threaded bores in the first plate 31 that are provided for this purpose, the oblong holes in the second plate 32 enabling the second adjustment plate 32 to be displaced relative to the first plate 31 along the axis Y when the fixing screws 17 are not tightened. On either side of the second plate 32, the first plate 31 is also provided with strips 31b for guiding the second plate 32 on the first plate 31 along the axis Y by preventing any movement along the axis X. Finally, in register with the bottom portion of the second plate 32, the first plate 31 is provided with a stop 31c provided with a threaded bore extending along the axis Y and provided with an adjustment screw whose end comes to bear against the bottom edge of the first plate 31 and enables it to be positioned accurately along the Y axis before it is prevented from moving by tightening the fixing screws 17.

In its center, the second plate 32 is provided with a support disk 33 which comes to be fixed directly against the end of the thrust rod 21, this disk having a spherical periphery co-operating with an opening of complementary shape formed in the second plate 32, thereby forming a ball coupling enabling the plane of the disk 33 to rotate relative to the plane of the second plate 32. Preferably, the second plate 32 is provided with a flange coupling screw making it possible to prevent the disk 33 from rotating relative to the second plate 32. The thrust rod 21 is centered on the support disk 33 by means of multiple studs 33a distributed around a peripheral margin of the disk 33, and coming to be received in holes in the end of the thrust rod 21, final securing being achieved by means of fixing screws passing through holes in the disk 33 and coming to screw into threaded bores provided for this purpose in the end of the thrust rod 21.

The resulting interface apparatus 35 makes it possible to secure the vehicle 12 to be propelled to the thrust rod 21 of the testing apparatus while also making it possible to adjust the alignment of the thrust rod 21 on the axis of the launch tube 20, excellent alignment being essential to obtaining optimum thrust without any risk of the test apparatus being damaged.

Figure 5:
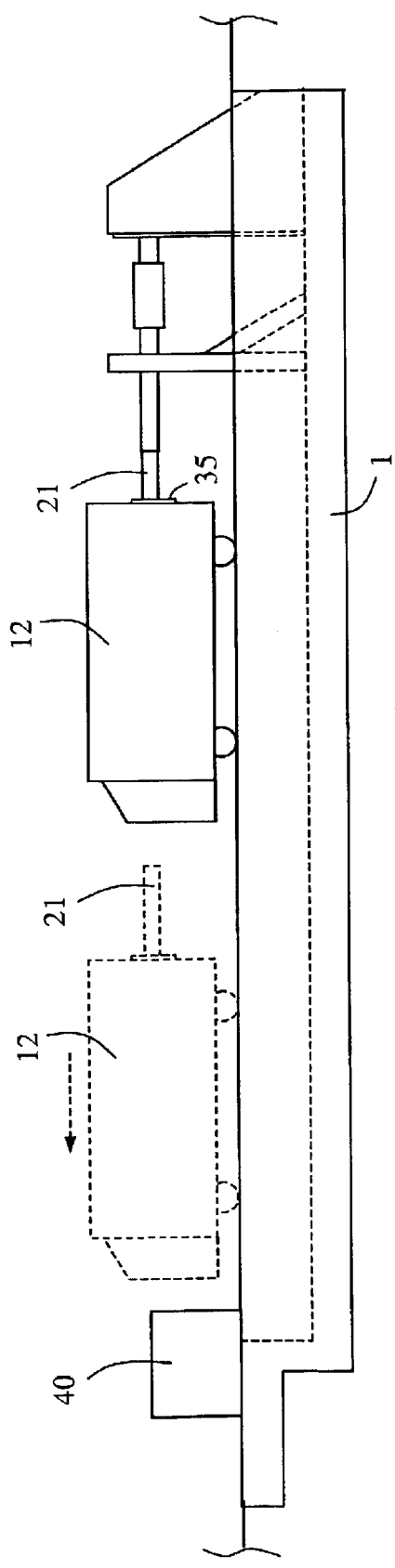

FIG. 5 shows another configuration in which the test apparatus of the invention may be used. In this configuration, the pyrotechnics launcher 2 is used as a catapult to propel a test vehicle 12 weighing about 55 t with energy of 6 MJ into an obstacle 40 disposed on the track. In this configuration, the pyrotechnics launcher 2 is placed slightly higher than in the preceding configuration so that the thrust rod 21 is still substantially aligned with the center of gravity of the test vehicle 12. In a manner similar to the preceding configuration, the front face of the test vehicle 12 is provided with an energy absorber element 14 to be tested, and the rear face of the vehicle 12 is connected to the thrust rod 21 via the above-described interface apparatus 35. In this type of test, the pit 4 may advantageously be equipped with an upwardly tilted camera for enabling the deformations occurring on impact to be filmed from underneath.

FIG. 6 shows yet another configuration in which the test apparatus of the invention can be used. In this configuration, the pyrotechnics launcher 2 is used with the thrust rod 21 being propelled with programmed acceleration. In this configuration, a test vehicle 12 supporting an energy absorber element 14 is placed against another vehicle 13, with the energy absorber element being interposed between the two vehicles 12 and 13. The two vehicles 12 and 13 together are sandwiched between a metal structure 18 fixed to the concrete slab 1, and the thrust rod 21 of the pyrotechnics launcher 2. For such a test, the thrust rod 21 is disposed level with the rigid underframes of the vehicles 12 and 13.

FIG. 7 shows a configuration in which the pyrotechnics launcher 2 is used as a static press to subject a rail vehicle structure to various forces. In this configuration, the vehicle 12 to be tested is sandwiched between a metal structure 18 fixed to the concrete slab 1 and the thrust rod 21 of the pyrotechnics launcher 2. For such a test, the thrust rod is preferably disposed level with the rigid underframe of the vehicle 12, but the height at which it is disposed may vary as a function of the objectives of the tests performed.

FIG. 8 shows a configuration preferably used for testing energy absorber elements of low capacity. In this configuration, the pyrotechnics launcher 2 is lowered into the pit 4 so that the axis of the launch tube 20 is level with the launch trolley 5. The energy absorber element 15 to be tested is disposed at the end of the pit 4 in alignment with the trolley 5 so that the trolley catapulted by the pyrotechnics launcher 2 comes to hit the energy absorber element 15. The launch trolley 5 may be used on its own or else it may be propelled by being coupled rigidly via its securing ring 51 to a small vehicle standing on the rails of the rail track 3 so as to increase the mass coming to hit the energy absorber 15. In a variant (not shown) using a configuration similar to FIG. 8, the launch trolley 5 may also be used to pull a lightweight vehicle of the motor vehicle type by means of the securing ring 51, for performing crash tests, for example.

Such apparatus thus makes it possible to perform mechanical tests, in particular for testing the strength of energy absorber elements in the field of railways, over a wide power range, by means of the pyrotechnics launcher and in numerous configurations by adjusting the height of the pyrotechnics launcher. In addition, the pyrotechnics launcher being prevented from recoiling by a buffer stop element being disposed against its rear portion, thereby simultaneously guaranteeing that the launch tube and the rail track are properly parallel, makes it possible to maintain excellent parallelism between the launch tube and the rail track during the launches because the recoil effect tends to cause the abutment surfaces to bear against each other, thereby guaranteeing the parallelism. Finally, the parallelism between the launch tube and the rail track during the launches is sustained even more strongly by the fact that the buffer stop element, the gantry frame supporting the pyrotechnics launcher, and the rail track are secured to the same concrete slab.

Naturally, the invention is in no way limited to the implementation described and shown, which is given merely by way of example. Modifications remain possible, in particular concerning the make up of the various elements, or the use of equivalent substitute techniques, without going beyond the scope of protection of the invention.

What is claimed is:

1. Apparatus for performing mechanical tests on structures, in particular on energy absorber elements in the field of railways, wherein a pyrotechnics launcher comprising a launch tube slidably receiving a thrust rod is disposed at one end of a segment of rail track, said pyrotechnics launcher being supported in its central portion by a support element and being prevented from moving backwards by a buffer stop element disposed behind the pyrotechnics launcher, said support element and said buffer stop element including fixing means making it possible to hold said pyrotechnics launcher at various heights relative to the rails of the rail track.

2. Apparatus according to claim 1, wherein said buffer stop element and said support element stand on a concrete slab, said concrete slab also supporting a portion of the segment of rail track.

3. Apparatus according to claim 2, wherein said concrete slab is anchored in the ground by means of anchoring piles driven into the ground and embedded in part in said concrete slab.

4. Apparatus according to claim 2, wherein said concrete slab is provided with a pit extending between the rails of the rail track, said pit receiving a launch trolley which is mounted to slide between the rails and which can be propelled by the thrust rod.

5. Apparatus according to claim 4, wherein the fixing means for fixing the pyrotechnics launcher to the support element and to the buffer stop element make it possible to lower the pyrotechnics launcher below the level of the rails of the rail track, and wherein said pit has a wall facing towards the pyrotechnics launcher and that can receive an energy absorber element which is to be tested and against which said launch trolley crashes.

6. Apparatus according to claim 1, wherein said support element is a gantry frame comprising two vertical elements provided with multiple holes making it possible to fix brackets at various heights for supporting a ring surrounding the launch tube, it being possible for said ring to pivot on said brackets about a horizontal axis perpendicular to the axis of the launch tube.

7. Apparatus according to claim 1, wherein said buffer stop element is constituted by a block of concrete having a substantially vertical wall against which a fixing plate is fixed that is disposed accurately perpendicular to the plane of the rails of the rail track, said fixing plate being provided with multiple holes making it possible to fix, at various heights, an abutment bracket to the end of which the rear end of the pyrotechnics launcher is fixed.

8. Apparatus according to claim 1, wherein the thrust rod is supported directly by a vehicle by means of interface apparatus provided with means for adjusting the alignment of the thrust rod on the axis of the launch tube.

* * * * *